No. 799,499. PATENTED SEPT. 12, 1905.
R. B. SMITH.
ILLUSION APPARATUS.
APPLICATION FILED APR. 17, 1905.
3 SHEETS—SHEET 1.
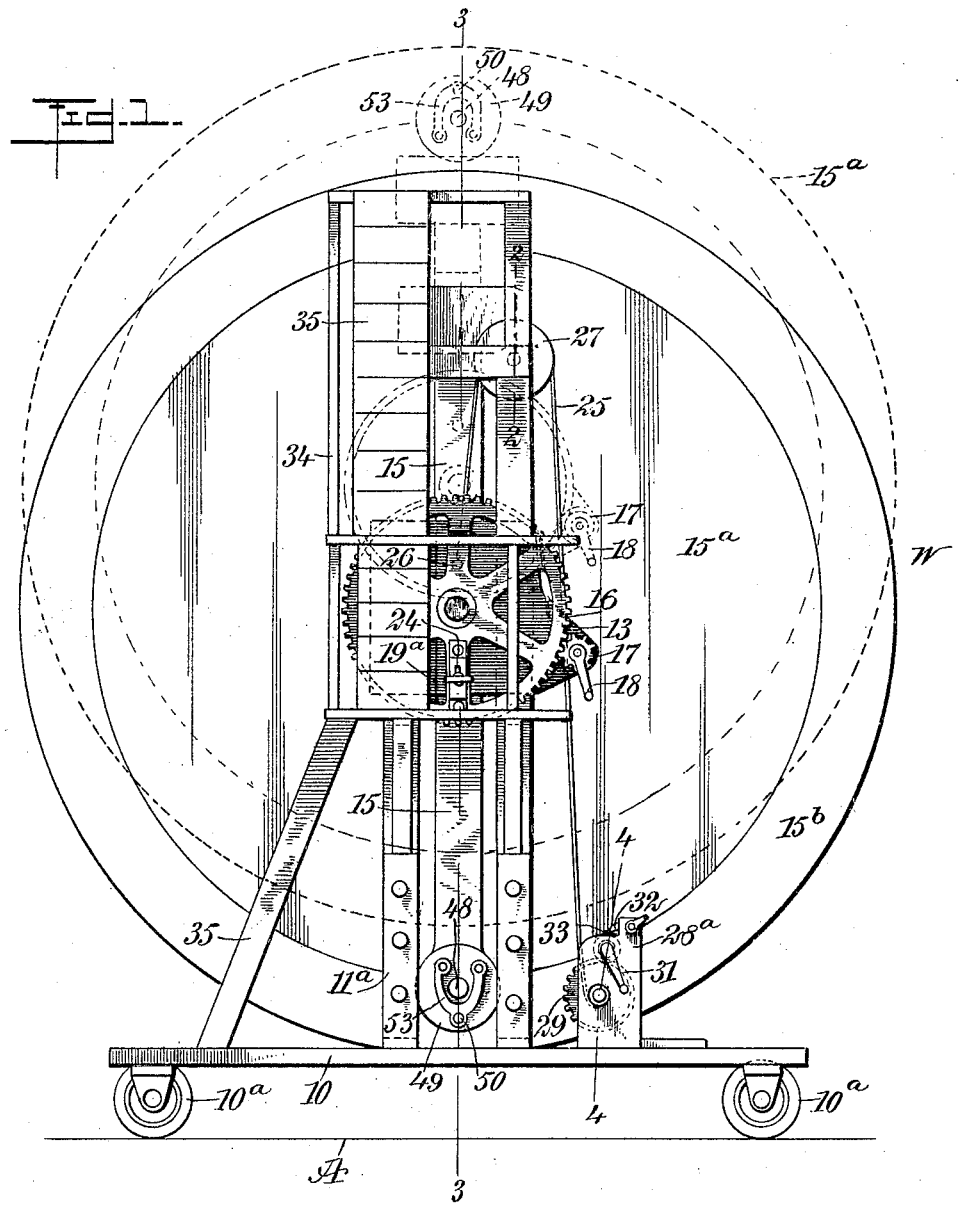
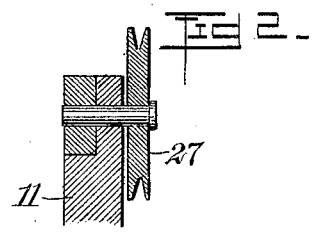
WITNESSES:
INVENTOR
Richard B. Smith
BY
ATTORNEYS No. 799,499. PATENTED SEPT. 12, 1905.
R. B. SMITH.
ILLUSION APPARATUS.
APPLICATION FILED APR. 17, 1905.
3 SHEETS—SHEET 2.
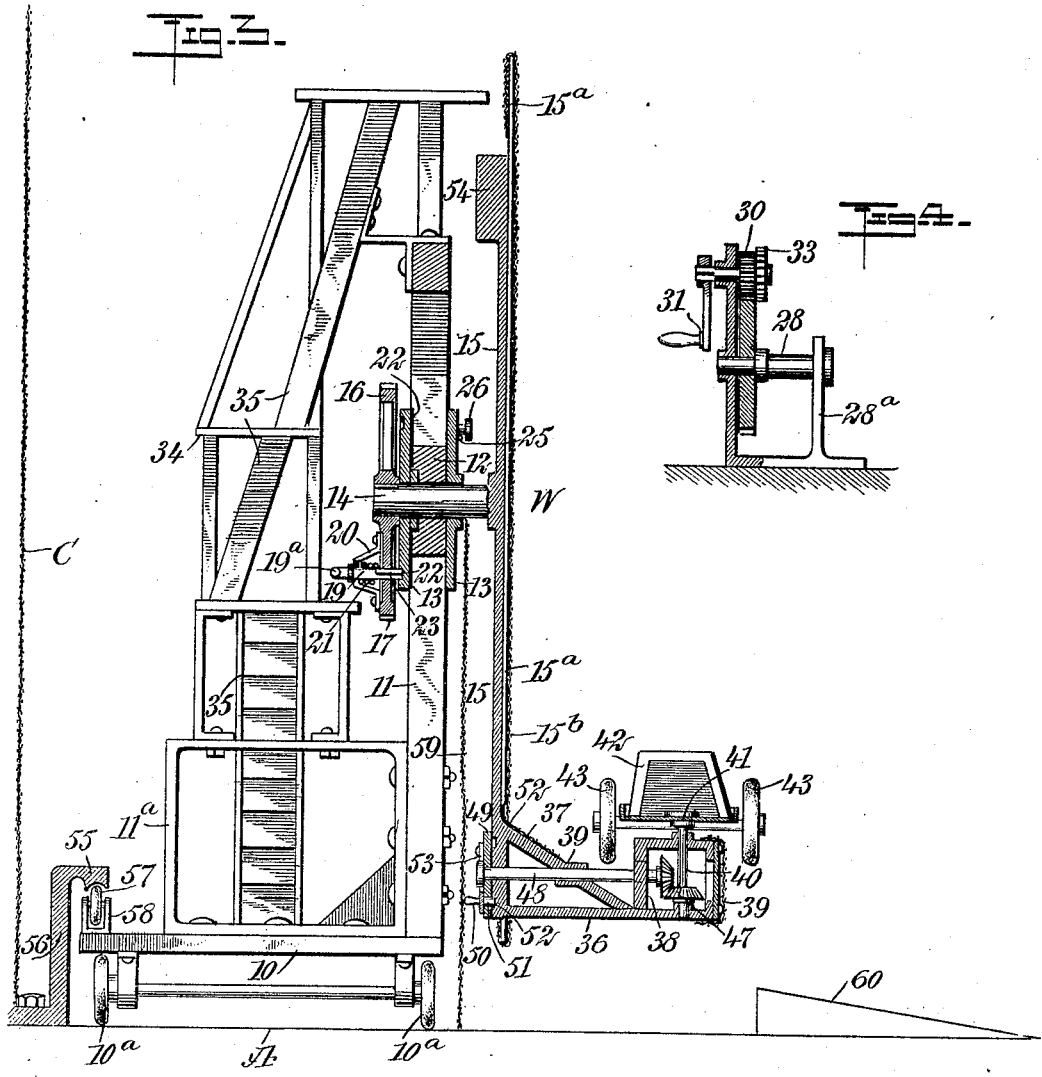
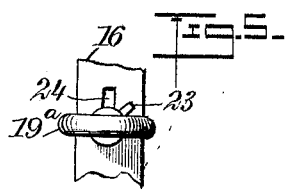
WITNESSES:
Geo. P. Kingsbury
S. H. Cobb
INVENTOR
Richard B. Smith
BY
Munn
ATTORNEYS No. 799,499. PATENTED SEPT. 12, 1905.
R. B. SMITH.
ILLUSION APPARATUS.
APPLICATION FILED APR. 17, 1905.
3 SHEETS—SHEET 3.
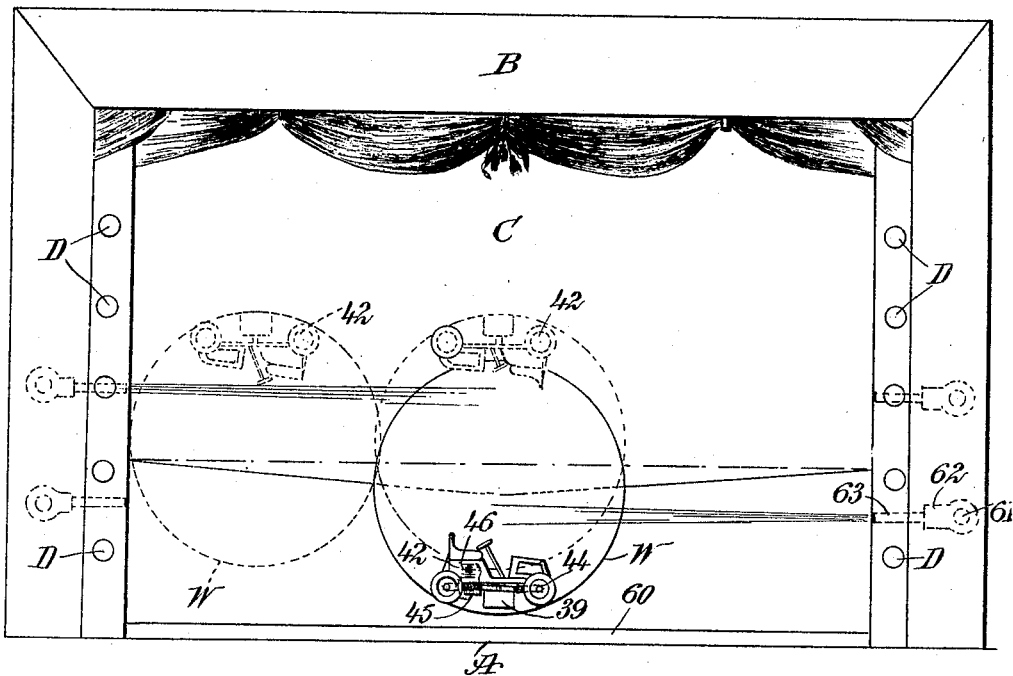
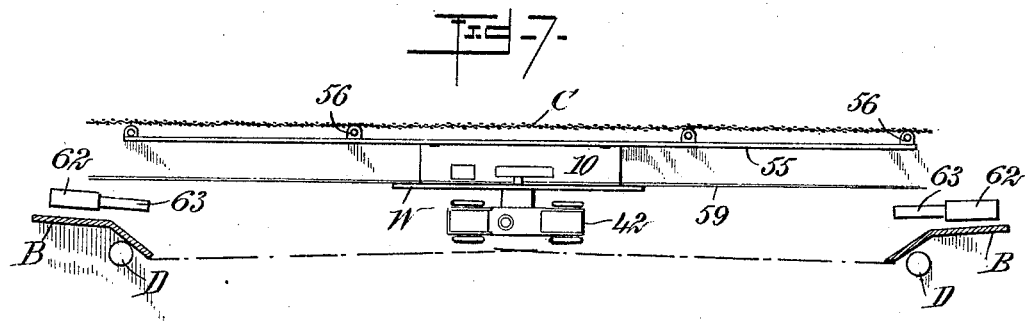
WITNESSES:
INVENTOR
Richard B. Smith
BY
ATTORNEYS

UNITED STATES PATENT OFFICE.

RICHARD B. SMITH, OF SYDNEY, NEW SOUTH WALES, AUSTRALIA.

ILLUSION APPARATUS.

No. 799,499.	Specification of Letters Patent.	Patented Sept. 12, 1905.

Application filed April 17, 1905. Serial No. 255,947.

*To all whom it may concern:*

Be it known that I, RICHARD B. SMITH, a subject of the King of Great Britain, and a resident of Sydney, New South Wales, Australia, have invented a new and Improved Illusion Apparatus, of which the following is a full, clear, and exact description.

My invention relates to apparatus for producing illusions, and particularly to those adapted for the stage. Its principal object is to provide effective and readily-operated means for securing the delusive effect.

Reference is to be had to the accompanying drawings, which form a part of this specification, in which like characters of reference indicate like parts in the several views.

Figure 1 is a rear elevation of one embodiment of my invention. Fig. 2 is a sectional detail on the line 2 2 of Fig. 1. Fig. 3 is a full vertical section on the line 3 3 of Fig. 1. Fig. 4 is a sectional detail of the windlass mechanism on the line 4 4 of Fig. 1. Fig. 5 is a detail in front elevation of the locking device for the wheel-rotating mechanism. Fig. 6 illustrates the invention in place upon a stage, and Fig. 7 is a horizontal section taken above the apparatus.

I have here shown a stage A, having a proscenium B. Across the stage is stretched a light-absorbing curtain or screen C, which may be of black velvet, as is commonly employed in stage-illusions. About the proscenium, at the side toward the audience, are dazzle-lights D, the rays which would be directed upon the stage being cut off by suitable screens or by the sides of the proscenium-arch. These tend to obscure or render indistinct objects upon the stage.

My improved apparatus comprises a support which includes a platform 10, mounted to travel upon wheels $10^a$, this permitting easy horizontal movement of the entire apparatus. At the side of the platform which will be toward the audience when the apparatus is upon the stage is standard 11, suitably braced at $11^a$ and having separated members furnishing ways, between which moves a bearing-block 12, plates 13 extending from this block over the ways to retain it against lateral displacement. Journaled in the block is a main shaft or axle 14 of a wheel W, which may consist of spokes 15, extending upon opposite sides of the shaft and carrying a disk $15^a$. The outer side of the disk is provided with a light-absorbing covering $15^b$, similar to the screen. Fast upon the shaft 14 is a gear 16, with which meshes a pinion 17, rotatable upon the inner plate 13 and having a crank 18, by which it may be turned to rotate the wheel about its axis. The gear and wheel may be locked against rotation by a bolt 19, having at its end farthest from the wheel a finger-piece $19^a$ and being movable in a guide member 20. A spring 21, surrounding the bolt, tends to seat it in sockets 22, formed about the adjacent plate 13. From one side of the bolt is a lateral projection 23, movable through a slot 24, projecting from the main opening in the gear, through which the bolt moves. This projection when brought to the face of the gear farthest from the plate-sockets may be turned out of alinement with the slot, thus maintaining the bolt from engagement with said sockets.

The bearing-block may be moved vertically along the standard by a cable or flexible member 25, extending from a stud 26, fixed to the outer plate 13, over a guide-pulley 27, rotatable in the top of the standard, and then downwardly to a windlass-drum 28, journaled in a frame $28^a$, fixed to the platform. This drum has fast upon it a gear 29, which is engaged by a pinion 30, the shaft of which is journaled in the windlass-frame and which has a crank 31, rotatable to raise the bearing-block and wheel or to allow it to be lowered. The windlass-drum, and therefore the block, may be fixed in position by a pawl 32, pivoted upon the frame $28^a$ and engaging a ratchet-wheel 33, rotatable with the pinion 30. At the inner side of the standard above its bracing members is a staging 34, the various parts of which may be reached by ladders 35. This enables the operators to properly manipulate the crank 18, with the lock for its gearing, and other portions of the apparatus in their various positions.

Extending from the outer face of one of the spokes at its end is a supporting-arm 36, which may be braced at 37 and carry at its outer extremity a casing 38. All portions of this supporting-arm and the more closely associated elements which are exposed to the view of the audience are covered with suitable black material, (indicated at 39.) Upon the outer supporting-arm is a carrier for the object, this, as here illustrated, consisting of a shaft 40, journaled in the casing and having at its end toward the axis of the wheel a head 41. Upon this head, which constitutes the carrier proper, is fixed a vehicle 42, preferably of the automobile type. This vehicle has wheels 43, the axles of which are connected by sprocket-gearing 44 to the shaft of a motor 45, which is energized by a battery 46. The battery-circuit includes suitable controlling mechanism by which the current may be turned on or off to rotate or stop the wheel. The body of the vehicle may be of any desired form and need only be of sufficient strength to safely support the persons who are to share in the levitation, they being secured in the vehicle by concealed straps or the like. The shaft 40 is connected by bevel-gearing 47 with an operating-shaft 48, journaled in the wheel and the arm-brace and casing and extending through said wheel to its inner side. Here it has fixed upon it a plate 49, having a crank-handle 50, by which it may be rotated. This handle may also serve to lock the shaft against rotation, its inner end 51 being adapted to engage sockets 52, formed in the wheel at the side toward the plate. To allow the movement of the crank-handle with relation to the wheel-sockets, normally forcing it toward them, it may be mounted upon a spring 53, which is shown as bifurcated, straddling the inner end of the shaft 48 and being fixed to the plate at the extremities of its divided portions. Upon the end of the spoke opposite that which carries the supporting-arm is a counterweight 54, formed integrally with or secured to the spoke and being of sufficient bulk to substantially balance the arm, vehicle, and its occupant.

To prevent the overturning of the apparatus, a retaining member is provided, consisting of an inverted rail 55, carried upon a supporting portion 56, attached to the stage. The rail is preferably grooved, and in this groove operates a wheel 57, rotatable in bearings 58 at the opposite side of the platform from the standard. This arrangement permits the travel of the apparatus across the stage without leaving the sphere of action of the retaining member.

To conceal the persons operating the apparatus as they propel the platform or pass back and forth, a curtain 59 may be extended across the stage from one side to the other, this preferably reaching to a height approximately the greatest which the wheel-axle attains. The curtain may be flexibly supported or have some tension arrangement whereby its upper edge will follow the axle in its movement. As the supporting-arm preferably extends below the wheels of the vehicle, it is often desirable to furnish other concealing means for this than the black material with which it is covered. This may be done by placing upon the stage an inclined shield 60, the upper edge of which lies in the horizontal plane of the vehicle-wheels when these are in their lowest position or when said vehicle is supposed to be running upon the stage. This shield will of course be painted black or covered with black fabric.

In using the apparatus the performer is secured within the vehicle while it is situated in the wings. The wheel-shaft being in its lowest position and the wheel 57 beneath the retaining-rail, the apparatus may be run upon the stage, the vehicle-wheels being caused to rotate by their actuating mechanism. It will be seen that the vehicle is now capable of four distinct primary movements—that of horizontal translation back and forth across the stage by virtue of the movement of the platform, vertical translation through the movement of the wheel bearing upon the standard, revolution about the horizontal axis of the wheel, effective by turning the crank 18, and rotation about the axis of the carrier-shaft secured by operating the crank-handle 50. These movements may be applied singly or two or more of them impressed upon the vehicle simultaneously, so that it may be caused to describe complex curved paths, during which it turns to proceed in opposite directions. During this manipulation any one or all of the motions may be stopped at will and a fixed relation maintained, this being secured by the locks associated with the cranks 18, 31, and 50 and by checking the travel of the platform across the stage. At all times while the apparatus is upon the stage all its elements except the vehicle and its occupant are entirely concealed from the audience by the dark covering of the apparatus, the curtain, shield, and the action of the dazzle-lights. Thus the delusive effect is secured, the performer appearing to guide the vehicle through the air without support. The occupant of the vehicle may be brought more clearly into the view of the spectators by lights 61, situated in the wings at each side of the proscenium-arch and protected by opaque casings 62, which have projecting toward the apparatus tubular extensions 63. These extensions cut off all the light-rays which would tend to fall upon the screen and other objects and make them visible and direct said rays upon the performer and vehicle only.

Having thus described my invention, I claim as new and desire to secure by Letters Patent—

1. An illusion apparatus, comprising a traveling support, a disk-like member mounted to revolve upon the support about a vertically-movable horizontal axis, and a carrier mounted upon said member to rotate about a vertical axis.

2. In an illusion apparatus, the combination with a traveling support, of a wheel rotatable upon the support about a horizontal axis, and a carrier mounted upon the wheel to rotate about a vertical axis.

3. In an illusion apparatus, the combination with a support, of a wheel mounted to revolve on the support about a vertically-movable horizontal axis, and a carrier mounted upon the wheel to rotate about a vertical axis.

4. An illusion apparatus comprising a traveling platform, a standard extending therefrom, a wheel rotatable upon the standard about a horizontal axis, and a carrier mounted upon the wheel at one side of its axis.

5. An illusion apparatus comprising a traveling platform, a standard extending therefrom, a wheel rotatable upon the standard about a vertically-movable horizontal axis, and a carrier movable upon the wheel at one side of its axis.

6. An illusion apparatus comprising a traveling platform, a standard extending therefrom, a wheel rotatable upon the standard about a vertically-movable horizontal axis, and a carrier rotatable upon a vertical axis carried by the wheel at one side of its axis.

7. An illusion apparatus comprising a traveling platform, a standard extending therefrom, a wheel rotatable upon the standard about a horizontal axis, a carrier mounted upon the wheel at one side of its axis, and means for moving the wheel vertically upon the standard.

8. An illusion apparatus comprising a traveling platform, a standard extending therefrom and having ways, a bearing movable upon the ways, a wheel mounted on a horizontal axis in the bearing, and a carrier mounted upon a vertical axis carried by the wheel at one side of its axis.

9. An illusion apparatus comprising a support, a wheel rotatable upon the support about a horizontal axis, an arm projecting horizontally from the wheel, a vertical carrier-shaft rotatable upon the arm and extending through the wheel, and means for turning the carrier-shaft.

10. An illusion apparatus comprising a support, a wheel rotatable upon the support about a horizontal axis, an arm projecting horizontally from the wheel, a vertical carrier-shaft rotatable upon the outer end of the arm, and an operating-shaft extending through the wheel and being geared to the carrier-shaft.

11. An illusion apparatus comprising a support, a wheel rotatable upon the support about a horizontal axis, an arm projecting horizontally from the wheel, a vertical carrier-shaft rotatable upon the arm, an operating-shaft extending through the wheel and being geared to the carrier-shaft, and a lock for the operating-shaft.

12. An illusion apparatus comprising a wheeled platform, a standard extending from the platform at one side thereof, a carrier movable upon the standard, and a relatively fixed retaining member extending over the platform at the side opposite the standard, whereby the overturning of the apparatus is prevented.

13. An illusion apparatus comprising a wheeled platform, a standard extending from the platform at one side thereof, a carrier movable upon the standard, a relatively fixed retaining member extending over the platform at the side opposite the standard, and a wheel journaled upon the upper side of the platform and contacting with the retaining member.

14. An illusion apparatus comprising a support, a revoluble wheel on the support, a carrier mounted upon the wheel, a wheeled vehicle mounted upon the carrier, and means for rotating the vehicle-wheels.

15. An illusion apparatus, comprising a wheeled platform, a wheel mounted on the platform to revolve about a horizontal axis, a wheeled vehicle mounted upon said wheel to rotate about a vertical axis, and means for rotating the wheels of the vehicle.

16. An illusion apparatus, comprising a wheeled platform, a wheel mounted on the platform to revolve about a vertically-movable horizontal axis, said wheel being provided with a horizontal arm at one side of its axis, a wheeled vehicle mounted on the outer end of the arm to rotate on a vertical axis, and means for rotating the wheels of the vehicle.

17. An illusion apparatus, comprising a wheeled platform provided with a standard, an adjustable bearing in the standard, a horizontal shaft mounted in the bearing, means for operating the shaft, a wheel on said shaft and provided with a horizontal arm, a vertical shaft mounted in the said arm, means for operating the said shaft, a wheeled vehicle carried by the shaft, and means for operating the wheels of the vehicle.

18. An illusion apparatus, comprising a wheeled platform provided with a standard having vertical guideways, a bearing mounted to slide in the guideways, means for raising and lowering the bearing, a horizontal shaft mounted in the bearing, means for operating the shaft, a wheel on the shaft and provided with a horizontal arm, a vertical shaft mounted in the outer end of the arm, means for operating the vertical shaft, and a carrier on the upper end of the vertical shaft.

In testimony whereof I have signed my name to this specification in the presence of two subscribing witnesses.

RICHARD B. SMITH.

Witnesses:
 JNO. M. RITTER,
 A. H. DAVIS.